(12) United States Patent  
Ollgaard

(10) Patent No.: US 8,707,656 B2
(45) Date of Patent: Apr. 29, 2014

(54) SAFETY BLANKET

(75) Inventor: Borge Ollgaard, Esbjerg (DK)

(73) Assignee: Vestas Wing Systems A/S, Aarhus N. (DK)

( * ) Notice: Subject to any disclaimer, the term of this patent is extended or adjusted under 35 U.S.C. 154(b) by 0 days.

(21) Appl. No.: 13/504,657

(22) PCT Filed: Nov. 2, 2010

(86) PCT No.: PCT/EP2010/066614
§ 371 (c)(1),
(2), (4) Date: Apr. 27, 2012

(87) PCT Pub. No.: WO2011/051492
PCT Pub. Date: May 5, 2011

(65) Prior Publication Data
US 2012/0210659 A1 Aug. 23, 2012

Related U.S. Application Data

(60) Provisional application No. 61/257,221, filed on Nov. 2, 2009.

(30) Foreign Application Priority Data

Nov. 2, 2009 (DK) ................................ 2009 70185

(51) Int. Cl.
E04B 1/00 (2006.01)
E04G 21/00 (2006.01)
E04G 23/00 (2006.01)

(52) U.S. Cl.
USPC ............ 52/745.04; 52/845; 52/222; 182/112; 182/136; 182/144; 182/146; 182/150; 182/138

(58) Field of Classification Search
USPC .............. 52/745.04, 843, 845, 192, 196, 222; 290/55; 340/13.32; 182/128, 129, 130, 182/112, 133, 135, 136, 137, 138, 139, 140, 182/144, 146, 150; 482/27, 29; 416/DIG. 6
See application file for complete search history.

(56) References Cited

U.S. PATENT DOCUMENTS 896,213 A * 8/1908 Kerfoot .................... 182/138
952,871 A 3/1910 Browder
(Continued)

FOREIGN PATENT DOCUMENTS

CN 2849042 12/2006
CN 201165943 12/2008
(Continued)

OTHER PUBLICATIONS

Carsten Nielsen; 1st Technical Examination and Search Report issued in priority Denmark Application No. PA 2009 70185; May 27, 2010; 6 pages; Denmark Patent and Trademark Office.
(Continued)

Primary Examiner — Chi Q Nguyen
(74) Attorney, Agent, or Firm — Wood, Herron & Evans, LLP

(57) ABSTRACT

The present invention relates to a tower for a wind power installation. The tower comprises a wall extending from a foundation in an upwards direction towards a nacelle and defines an enclosed space. Furthermore, the tower comprises a safety blanket which is distended across the tower interior along an inner surface of the wall to thereby split the enclosed space into an upper compartment above the blanket and a lower compartment below the blanket. The safety blanket is flexible.

17 Claims, 10 Drawing Sheets

(56) References Cited

U.S. PATENT DOCUMENTS

| | | | | |
|---|---|---|---|---|
| 1,847,250 | A | * | 3/1932 | Maynes ............... 104/63 |
| 2,128,268 | A | * | 8/1938 | Small et al. ............ 72/404 |
| 2,145,232 | A | * | 1/1939 | Bauer .............. 52/651.06 |
| 3,693,729 | A | * | 9/1972 | Blurton et al. ......... 173/189 |
| 3,910,452 | A | * | 10/1975 | Szasz ................. 220/226 |
| 4,079,264 | A | * | 3/1978 | Cohen ................. 290/55 |
| 4,130,216 | A | * | 12/1978 | Creith ................. 220/224 |
| 4,202,460 | A | * | 5/1980 | Imbeault ............. 220/218 |
| 4,696,135 | A | * | 9/1987 | Kallinger et al. ........ 52/121 |
| 5,167,299 | A | * | 12/1992 | Nusbaum ............. 182/138 |
| 5,711,336 | A | * | 1/1998 | Nirmel ................ 135/87 |
| 6,247,277 | B1 | * | 6/2001 | Kerpash, Sr. .......... 52/192 |
| 6,325,085 | B1 | * | 12/2001 | Gower ................ 135/90 |
| 6,922,956 | B2 | * | 8/2005 | Johnson et al. ........ 52/192 |
| 7,382,232 | B2 | * | 6/2008 | Gidge et al. ......... 340/12.32 |
| 7,612,735 | B2 | * | 11/2009 | Essig et al. .......... 343/915 |
| 7,982,330 | B1 | * | 7/2011 | Ueno et al. ........... 290/55 |
| 8,033,078 | B2 | * | 10/2011 | Llorente Gonzalez ... 52/745.04 |
| 8,038,398 | B2 | * | 10/2011 | Nanukuttan et al. ...... 416/39 |
| 8,083,029 | B2 | * | 12/2011 | Teichert .............. 182/128 |
| 2003/0147753 | A1 | | 8/2003 | Ollgaard |
| 2006/0201744 | A1 | * | 9/2006 | Curtis et al. .......... 182/138 |
| 2009/0031668 | A1 | | 2/2009 | Llorente Gonzalez |

FOREIGN PATENT DOCUMENTS

| | | |
|---|---|---|
| EP | 1 933 029 | 6/2008 |
| JP | 2004-194867 | 7/2004 |
| KR | 10-2009-0072002 | 7/2009 |

OTHER PUBLICATIONS

Stefano Angelucci; International Search Report and Written Opinion issued in priority International Application No. PCT/EP2010/066614; Sep. 6, 2011; 11 pages; European Patent Office.

* cited by examiner

SAFETY BLANKET

FIELD OF THE INVENTION

The present invention relates to a safety blanket distended in a tower for a wind power installation and a method of distending a safety blanket.

BACKGROUND OF THE INVENTION

Vital components of a wind turbine, e.g. the rotor, rotor shaft, transmission and power generator, are located in a nacelle high above ground. The nacelle is held by a tower which traditionally is about 100 meters. However, the tower can for larger wind turbines be up to 150-200 meters high. The tower is normally constituted by a hollow circular shell structure of steel or concrete. The wall of the tower thus defines an internal space forming access to the nacelle.

Maintenance of a wind turbine involves working in the nacelle above the tower as well as working on various electronic devices which are typically located in the space of the tower, e.g. at the base of the tower. Workers therefore work in different altitudes of the tower construction and as a result, accidents may arise due to fallen objects, and in worst case, workers may even be injured by a fall.

Traditionally, one or more platforms have been arranged inside the tower to enable workers to carry out their work at different levels inside the tower, e.g. to connect two tower elements to each other. These platforms are solid and made of e.g. wood or aluminum. These platforms further allow for collection of pieces falling down from above. However, it has been shown that it is difficult to have the platform fit closely along the inner surface of the tower wall and thereby protect workers from small pieces falling along the inner surface. Furthermore, the platform is not well-suited if, in case of an accident, a worker should fall down from the ladder or when working at a higher altitude of the tower.

SUMMARY OF THE INVENTION

It is an object of embodiments of the present invention to provide a tower for a wind power installation with a safety blanket, and a method of distending such a safety blanket.

Thus, in a first aspect, the invention provides a tower for a wind power installation, the tower comprising a wall extending from a foundation in an upwards direction towards a nacelle and defining an enclosed space, wherein the tower further comprises a safety blanket distended across the tower interior along an inner surface of the wall to thereby split the enclosed space into an upper compartment above the blanket and a lower compartment below the blanket, wherein the safety blanket is flexible.

A safety blanket may be distended at a certain level above the floor of the wind turbine tower to protect workers in the lower compartment of the tower against objects which are dropped from the upper compartment of the tower.

The tower may be constituted by a hollow circular shell structure of steel or concrete or may be a lattice tower. It should however be understood, that the type of tower is not limiting for the invention, as the safety blanket may be distended across the tower interior along an inner surface of any tower.

The safety blanket may have a shape corresponding to a substantial horizontal cross-section of the tower, i.e. in case of a circular tower the safety blanket may be substantially circular, and in case of a four-sided tower the safety blanket may be substantially square-shaped, etc. It should however be understood, that there may be incisions along the edge of the safety blanket.

By splitting the enclosed space of the tower into an upper compartment and a lower compartment, the safety blanket may act as a ceiling for the lower compartment and thereby protect workers in the lower compartment against objects which are dropped from the upper compartment.

To facilitate distending of the safety blanket across the tower interior along the inner surface, the safety blanket is flexible. Furthermore, the inner surface of the tower wall may be provided with hooks, rails, or similar structures allowing the blanket to be fastened to the wall or to a frame along the inner surface, e.g. by tying it hereto. Other ways of fastening may also be applied.

By flexible is in this connection understood, that the safety blanket can be folded and un-folded again. Furthermore, the safety blanket can be stretched and the blanket is deflecting when something hits the blanket, i.e. when objects are dropped from above.

It should be understood, that more than one safety blanket may be distended across the tower interior along the inner surface, as safety blankets may be distended at different heights. Moreover, one or more safety blankets may be combined with one or more traditional platforms made of aluminium, wood, or other similar materials, thereby also having one or more solid platforms arranged in the interior of the tower. The solid platforms may further be used as working platforms when carrying out work inside the tower at different altitudes.

To stretch the blanket completely, it is desired to pull the edge of the blanket outwards, e.g. by use of a rubber band, a wire, a rope, a spring, or similar structure, preferably an elastically extendable structure.

The safety blanket may comprise a central part and a rim extending circumferentially about the central part. The bending stiffness of the rim may be larger than the bending stiffness of the central part.

The central part may be made of one or more of the following materials: nylon, plastic, other synthetic materials, Kevlar, carbon fibres, steel wires, fishing net, tarpaulin, etc. In one embodiment the central part comprises one layer only, whereas it in another embodiment is made partly or fully as a sandwich construction of one or more materials.

The rim may be made so that the bending stiffness hereof is larger than the bending stiffness of the central part. This may be done by selecting a material for the rim having a larger bending stiffness or by making it of more materials which together have a large bending stiffness than the bending stiffness of the central part. In one embodiment this is done by constructing the rim as a sandwich construction of different materials.

It should be understood, that by larger bending stiffness is in this connection understood, that the rim is less flexible than the central part. By having a larger bending stiffness, the rim can be fitted more closely along the inner surface of the tower wall and thereby also protect workers from small pieces falling along the inner surface of the tower wall from above. In one embodiment, the bending stiffness of the rim relative to the bending stiffness of the central part is in the range of 1.5-4 or more, such as 2-3.

It should be understood, that even though the rim has a larger bending stiffness, it may be an advantage if the safety blanket and thus the rim can be folded and unfolded again, as this may facilitate transportation of the safety blanket. This may be achieved by applying a material for the rim which allows bending or folding of the rim, e.g. a stiff, but flexible wire, or a rim made of rubber foam. Alternatively, the rim may comprise individual stiff sections so that the rim may be bended or folded section-wise.

If the blanket has a size which is smaller than the cross section of the tower at that location where the blanket is distended—in the following referred to as the "tower-cross-section"—this would lead to a gap between the tower wall and the blanket. If, on the other hand, the blanket is made with exactly the same size and shape as the tower-cross-section, this would cause difficulties in stretching the blanket completely unless the blanket is pulled towards the tower wall at points located at a distance from the edge of the blanket.

To improve the ability to stretch the blanket and to reduce the gap between the tower wall and the edge of the blanket, it is therefore an advantage to provide attachment points which are located along the edge of the safety blanket but yet offset a distance from the edge. This distance will in the following be referred to as the "offset".

The offset, however, may cause that the part of the blanket located between the tower wall and the attachment points to bend down, in particular if the rim is not supported by the wire or rope by which the blanket is attached to the tower wall, e.g. between the attachment points.

To provide a smaller offset and to prevent the rim from bending down, the rim may have a larger bending stiffness than the central part of the blanket.

The bending stiffness of the rim may be sufficient to ensure that the rim is a substantially self-bearing element. Thereby no support of the rim is needed when fitting the safety blanket along the inner surface of the tower wall.

In one embodiment, the blanket is stretched in an outwards direction towards the inner surface of the tower wall by a fixation structure which acts on the blanket at locations between the central part and the rim. I.e. in this embodiment, the size of the rim corresponds to the offset distance. In alternative embodiments, the fixation structure may act at locations on the rim, on the central part, or on both.

The fixation structure may comprise a string which can be elongated by elastic deformation. The string may extend circumferentially about the central part. The string may be adapted to pull the edge of the blanket outwards, and may comprise, for example, a rubber band, a wire, a rope, a spring, or a similar structure. The fixation structure may further comprise hooks, rails, or similar structures along the inner surface of the wall or at a frame along the inner surface.

As the string may cross in and out between attachment points on the blanket and hooks, rails, or similar structures along the inner surface of the wall or at a frame, the rim may extend circumferentially about at least a part of the string.

In one embodiment the string may be held on the inner surface of the tower wall by a rigid fixation structure fixed to the inner surface. The rigid fixation structure may comprise hooks, rails, rings, and similar structures. Alternatively, a similar rigid fixation structure may be fixed to a frame which may be attached to the inner surface or positioned along the inner surface.

The rigid fixation structure may be attached to the inner surface of the tower wall by welding, by use of screws, rivets, or the like. However, the rigid fixation structure may alternatively be releaseably attached to the inner surface of the tower wall thereby allowing for easy removal of the rigid fixation structure, if necessary. To releaseably attach the rigid fixation structure magnetic attraction forces may be applied by use of magnets, thereby preventing structure-weakening attachments to the tower wall.

The rim may have a layered structure comprising layers of different materials. One of these layers may comprise a foam material.

The central part may comprise a non-woven sheet material. Alternatively and additionally, the central part may comprise a woven material. Suitable material may be nylon, plastic, other synthetic materials, Kevlar, carbon fibres, tarpaulin, etc. The sheet material may be reinforced by, for example, steel wires, a structure similar to a fishing net, or other similar structures.

To facilitate distending of the blanket, the shape of the blanket may possess a high initial stability, i.e. it may be difficult the change the shape of the blanket. By possessing a high initial stability, each blanket can be designed to fit a specific tower having a size and shape corresponding to the tower-cross-section of the specific tower, thereby facilitating distending hereof.

The rim may terminate in an edge circumferentially about the blanket. The distance between the edge and the inner surface may be less than 1 percent of the circumference of the blanket. In one embodiment, the distance is below 20 millimeters.

The blanket may comprise one or more incisions along the rim forming passages between the blanket and the wall. The incisions may be of a size so that they also incise the central part. The incisions may be positioned so that the safety blanket can be distended even though a ladder is mounted at the inner surface of the tower, as the size of the incision may correspond to the size of the ladder and the position of the incision may correspond to the position of the ladder. The size of the incision may even be large enough to allow a person to climb the ladder while the blanket is distended along the inner surface of the tower wall.

To prevent built-up of water, oil, or other fluid media on the distended blanket, the central part may comprise at least one drainage opening allowing draining of a fluid medium between the upper and lower compartments. Furthermore, the drainage opening(s) may reduce pressure differences between the upper and lower compartments.

In a second aspect, the invention provides a method of distending a safety blanket across the tower interior along an inner surface of a wall of a tower for a wind power installation, the method comprising the steps of providing a blanket being flexible, stretching the blanket in an outwards direction towards the inner surface by use of a fixation structure which acts on locations on the blanket.

The blanket may comprise a central part and a rim extending circumferentially about the central part and the bending stiffness of the rim may be larger than the bending stiffness of the central part. The method may further comprise a step of stretching the blanket in an outwards direction towards the inner surface by use of a fixation structure which acts on the blanket on locations between the central part and the rim.

It should be understood, that the method of distending a safety blanket may be used in connection with the tower for a wind power installation according to the above-described first aspect of the invention may. Thus, the features of the first aspect of the invention may be applicable in relation to the method of distending a safety blanket of the second aspect of the invention.

BRIEF DESCRIPTION OF THE DRAWING

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
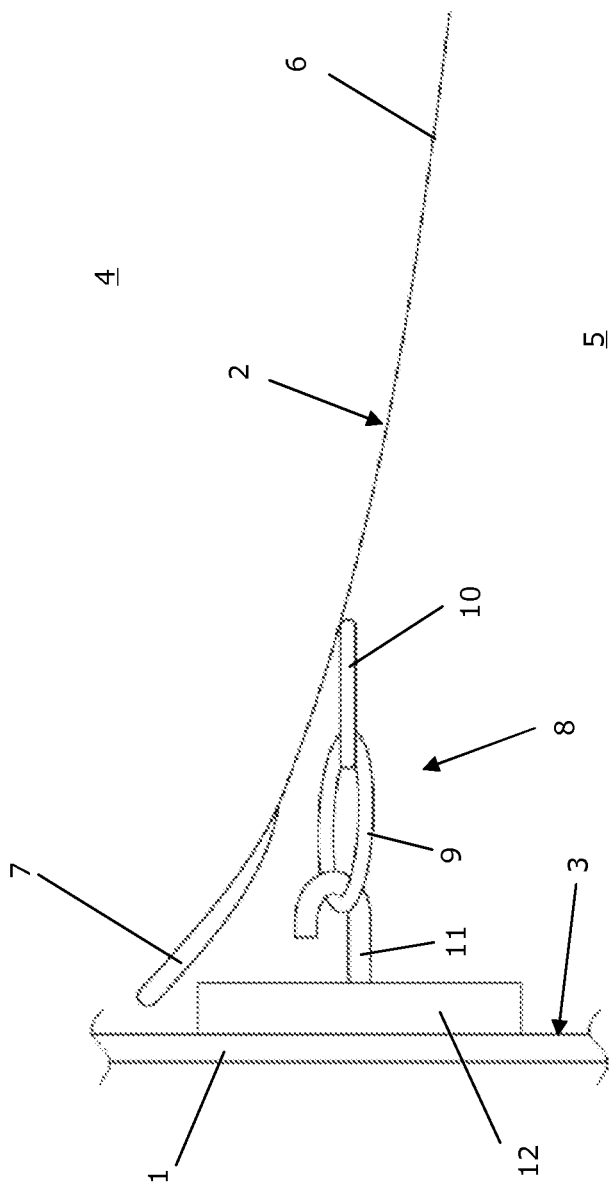
FIGS. 1-6 illustrate different embodiments of how to distend a safety blanket across the tower interior along an inner surface of a wall of a tower for a wind power installation.

FIG. 1. illustrates a section of a tower for a wind power installation. The tower comprises a wall 1 extending from a foundation (not shown) in an upwards direction towards a nacelle (not shown). The tower wall 1 defines an enclosed space. The tower further comprises a safety blanket 2 which is distended across the tower interior along an inner surface 3 of the wall 1 to thereby split the enclosed space into an upper compartment 4 above the blanket 2 and a lower compartment 5 below the blanket 2. The safety blanket 2 is flexible.

The safety blanket 2 comprises a central part 6 and a rim 7 extending circumferentially about the central part 6. The bending stiffness of the rim 7 is larger than the bending stiffness of the central part 6.

The blanket 2 is stretched in an outwards direction towards the inner surface 3 by a fixation structure 8 which acts on the blanket 2 at locations on the central part.

In the illustrated embodiment, the fixation structure 8 comprises a string 9 which can be elongated by elastic deformation. The string 9 extends circumferentially about the central part 6.

The fixation structure 8 furthermore comprises a plurality of rings 10 being attached to the bottom side of the safety blanket 2. The string 9 crosses in and out between attachment points on the blanket 2, i.e. the rings 10, and a rigid fixation structure 11, in this case a number of hooks fixed to the inner surface 3 of the tower wall 1.

The hooks 11 are magnetically fixed to the inner surface 3 as the hooks 11 are attached to magnets 12 which are fixed to the inner surface 3 of the tower wall 1.

Figure 2:
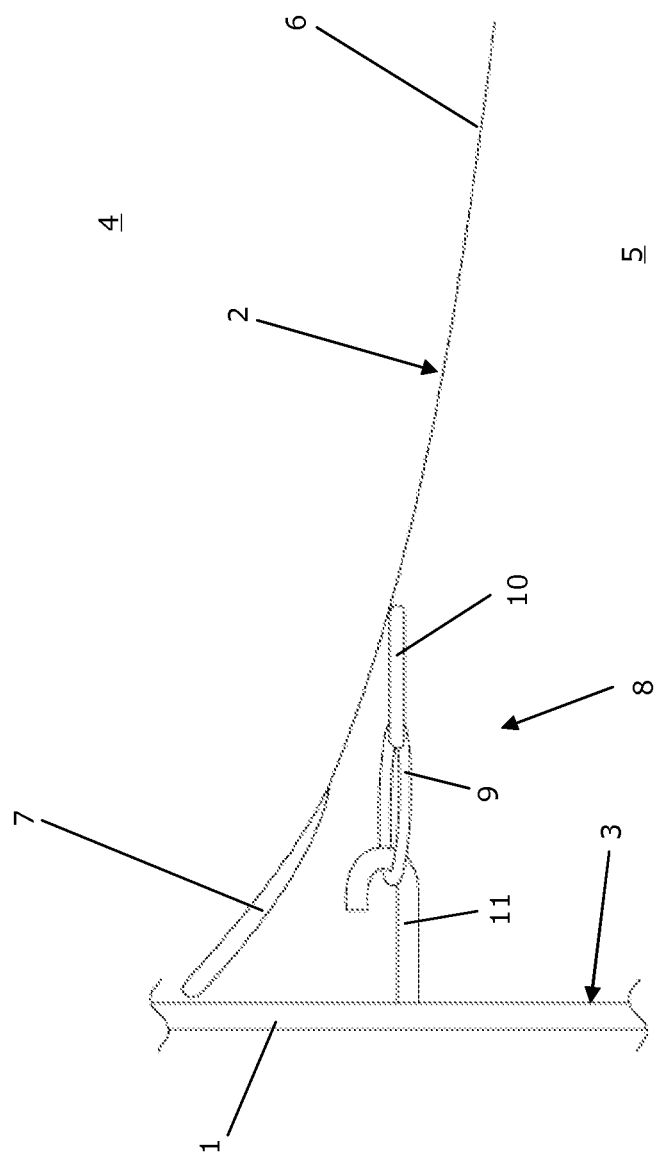

FIG. 2 illustrates a section of an alternative embodiment, in which the hooks 11 are attached to the inner surface 3 of the tower wall 1 by welding.

Figure 3:
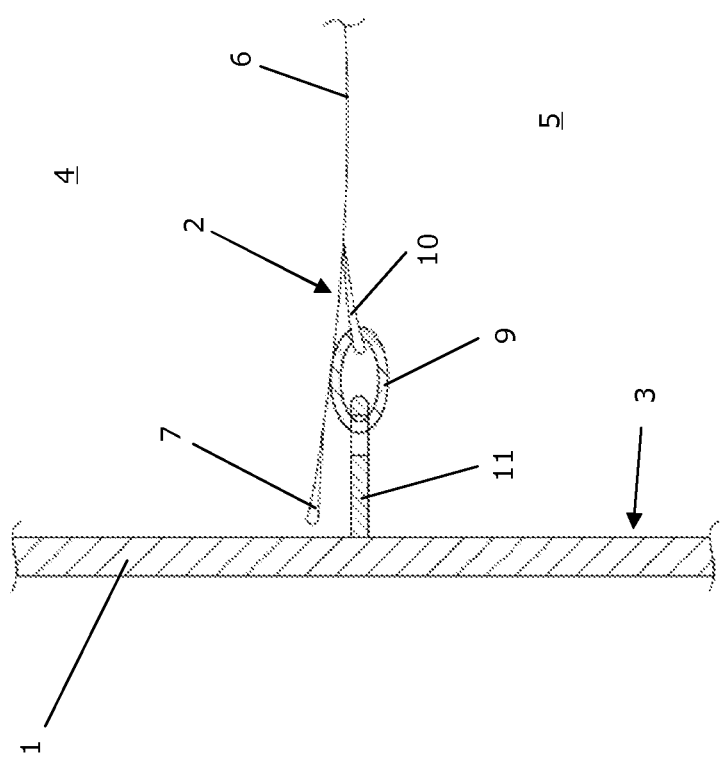

FIG. 3 illustrates a section of a further alternative embodiment, in which the fixation structure 11 comprises a flange. The flange 11 is attached to the inner surface 3 of the tower wall 1 by welding.

Figure 4:
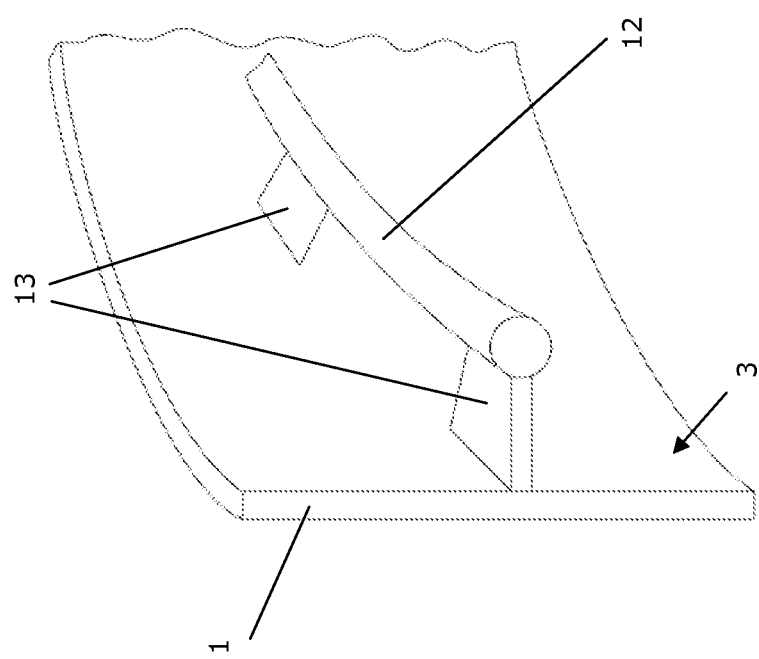

FIG. 4 illustrates a fourth embodiment of how to distend a safety blanket 2 across the tower interior along an inner surface 3 of a wall 1 of a tower for a wind power installation. The blanket (not shown in the figure) is distended by use of a round iron bar 12 and a plurality of flat bars 13 welded to the inner surface. The blanket (not shown) is stretched in an outwards direction towards the inner surface 3 by a string (not shown) which can be elongated by elastic deformation. The string extends circumferentially about the central part (not shown), and crosses in and out between the round iron bar 12 and attachment points on the blanket.

Figure 5:
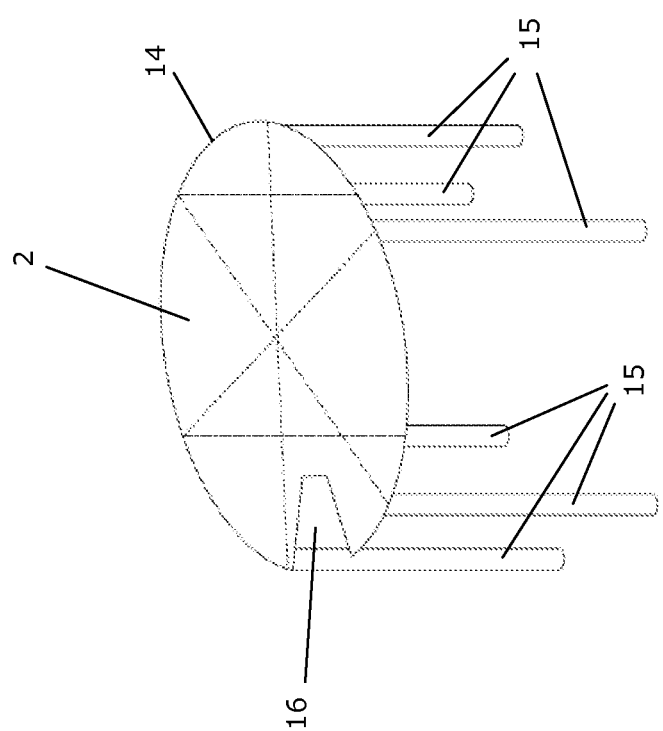

FIG. 5 illustrates a fifth embodiment, in which the safety blanket 2 is distended across the tower interior along an inner surface (not shown) of a wall (not shown) of a tower for a wind power installation by use of a frame structure 14 having a plurality of legs 15.

The blanket 2 is attached to the frame structure 14 which is positioned adjacent to the tower wall (not shown). The blanket 2 comprises an incision 16 along the rim forming passages between the blanket 2 and the wall. The incision is in this embodiment of a size so that it incises the central part 6. The incision 16 is positioned so that the safety blanket 2 can be distended even though a ladder (not shown) is mounted at the inner surface of the tower (not shown). The size of the incision is large enough to allow a person the climb the ladder while the blanket 2 is distended along the inner surface of the tower wall (not shown).

It should be understood, that incisions may also be formed in the embodiments of the safety blankets 2 of FIGS. 1-4 even though they are not shown.

Figure 6:
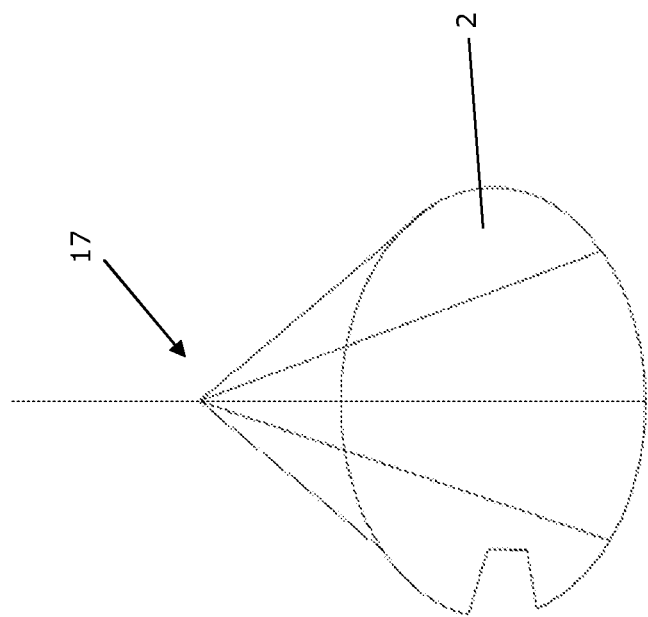

FIG. 6 illustrates a sixth embodiment, in which the safety blanket 2 is mounted by use of a suspension structure 17. The suspension structure 17 may, for example, be attached to the main frame in the top of the tower or to a solid platform above the safety blanket. Other ways of attaching the safety blanket may also be used.

Figure 7:
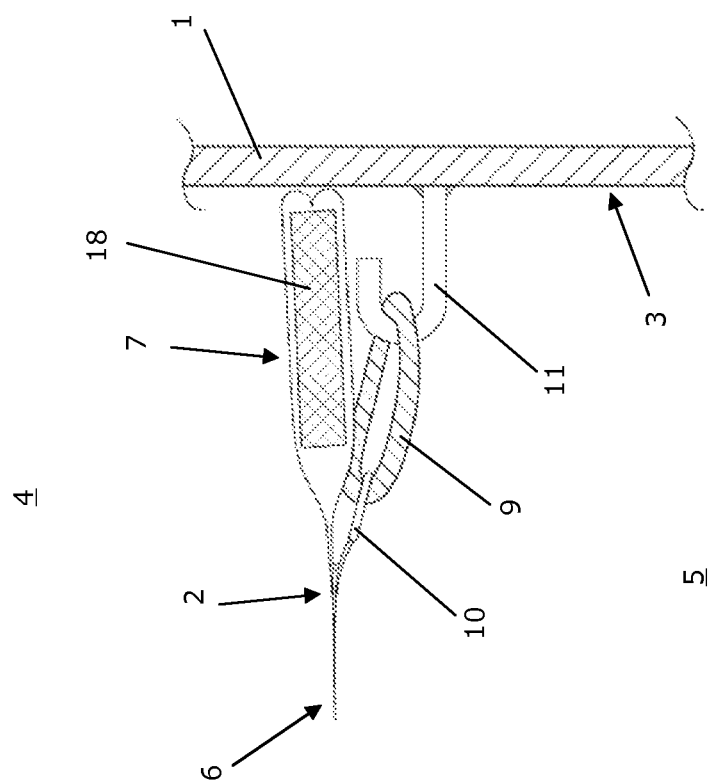
FIG. 7 illustrates details of the rim of an embodiment of a safety blanket.

FIG. 7 illustrates details of the rim 7 of an embodiment of a safety blanket 2 distended along the inner surface 3 of the tower wall 1. A string 9 extends circumferentially about the central part 6. The string 9 crosses in and out between attachment points on the blanket 2, i.e. the rings 10, and a number of hooks 11 fixed to the inner surface 3 of the tower wall 1. The hooks 11 are attached to the inner surface 3 of the tower wall 1 by welding.

The illustrated rim 7 has a layered structure comprising layers of different materials, one of the layers being a foam material 18. The foam material 18 is surrounded by a sheet material of e.g. nylon, plastic, other synthetic materials, Kevlar, carbon fibres, tarpaulin, or other.

Figure 8:
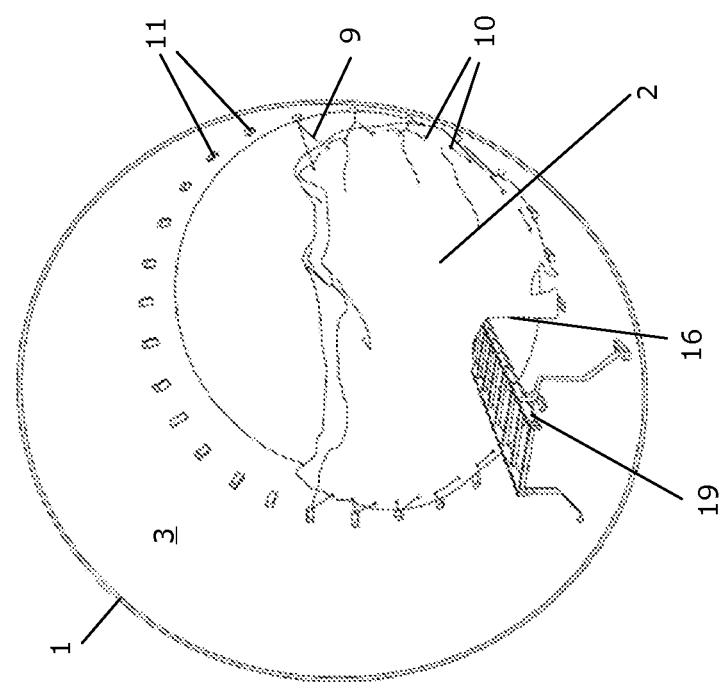
FIG. 8 illustrates how a safety blanket may be distended along the inner surface of a wind turbine wall.

FIG. 8 illustrates how a safety blanket 2 may be distended across the tower interior along the inner surface 3 of a wind turbine wall 1. In the illustrated embodiment, the blanket 2 is not fully distended. A string 9 extends circumferentially about the central part 6 of the blanket 2. The string 9 crosses in and out between attachment points on the blanket 2, i.e. the rings 10 at the bottom of the blanket 2, and a number of hooks 11 fixed to the inner surface 3 of the tower wall 1.

The blanket 2 comprises an incision 16 along the rim 7 forming passage between the blanket 2 and the wall 1. The incision 16 is in this embodiment of a size so that it incises the central part 6. The incision 16 is positioned so that the safety blanket 2 can be distended even though a ladder 19 is mounted at the inner surface 3 of the tower wall 1.

Figure 9:
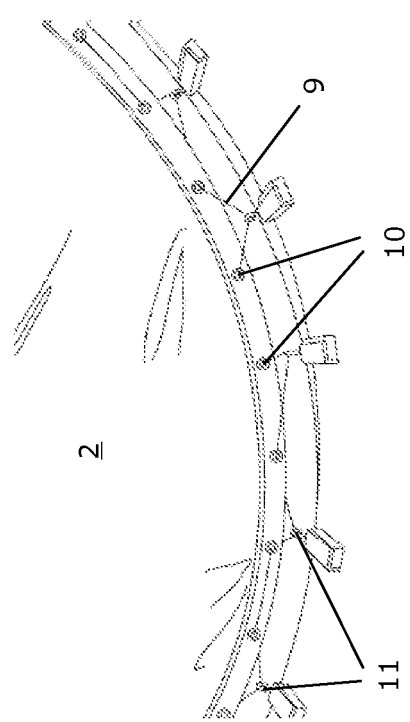
FIG. 9 illustrates a section of a safety blanket from below.
Figure 10:
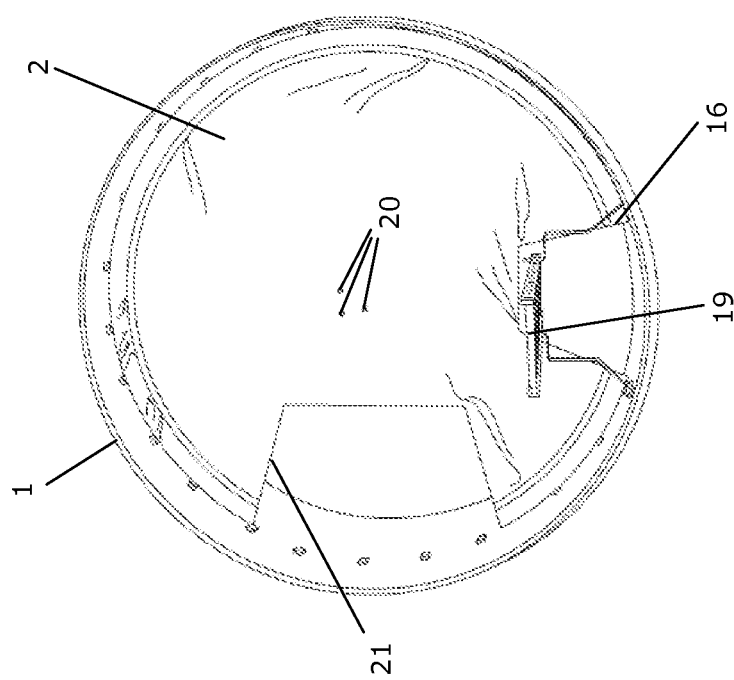
FIG. 10 illustrates a safety blanket from above.

FIG. 9 illustrates a section of a safety blanket 2 from below, and FIG. 10 illustrates a safety blanket 2 from above. The string 9 extends circumferentially about the central part 6 of the blanket 2. The string 9 crosses in and out between the rings 10 and a number of hooks 11 fixed to the inner surface 3 of the tower wall 1.

In FIG. 10 three drainage openings 20 are shown. These drainage openings 20 can limit or even prevent built-up of water, oil, or other fluid media on the distended blanket 2, as the drainage openings allow draining of a fluid medium between the upper and lower compartments 4, 5. Furthermore, the drainage openings 20 can reduce pressure differences between the upper and lower compartments 4, 5.

The blanket 2 comprises an incision 16 along the rim 7 forming a passage between the blanket 2 and the wall 1. The incision 16 is sized corresponding to the ladder 19 mounted at the inner surface 3 of the tower wall 1. Another incision 21 is sized corresponding to a lift (not shown) which in mounted in the tower. At the bottom of the tower the lift area and the ladder area are restricted areas so no nobody gets injured in case of fallen objects in these areas.

The invention claimed is:

1. A tower for a wind power installation, the tower comprising:
   a wall extending from a foundation in an upwards direction towards a nacelle and defining an enclosed space;
   a safety blanket distended across the tower interior along an inner surface of the wall to thereby split the enclosed space into an upper compartment above the blanket and a lower compartment below the blanket, wherein the safety blanket is flexible, wherein the safety blanket comprises a central part and a rim extending circumferentially about the central part, and wherein a bending stiffness of the rim is larger than a bending stiffness of the central part; and
   a fixation structure attached to the inner surface of the wall and further attached to the safety blanket to couple the safety blanket to the wall, wherein the fixation structure acts on the safety blanket at locations offset from the rim.

2. The tower according to claim 1, wherein the bending stiffness of the rim is sufficient to ensure that the rim is a substantially self-bearing element.

3. The tower according to claim 1, wherein the fixation structure comprises a rigid fixation structure attached to the inner surface of the wall.

4. The tower according to claim 3, wherein the rigid fixation structure is releaseably attached.

5. The tower according to claim 1, wherein the fixation structure comprises a string which can be elongated by elastic deformation, the string extending circumferentially about the central part.

6. The tower according to claim 5, wherein rim extends circumferentially about at least a part of the string.

7. The tower according to claim 5, wherein the string is held on the inner surface by a rigid fixation structure.

8. The tower according to claim 1, wherein the rim has a layered structure comprising layers of different materials.

9. The tower according to claim 8, wherein one of the layers comprises a foam material.

10. The tower according to claim 1, wherein the central part comprises a non-woven sheet material.

11. The tower according to claim 1, wherein the shape of the blanket possess a high initial stability.

12. The tower according to claim 1, wherein the rim terminates in an edge circumferentially about the blanket, a distance between the edge and the inner surface being less than 1 percent of the circumference of the blanket.

13. The tower according to claim 12, wherein the distance is below 20 millimeter.

14. The tower according to claim 1, wherein the central part comprises at least one drainage opening allowing draining of a fluid medium between the upper and lower compartments.

15. A tower for a wind power installation, the tower comprising a wall extending from a foundation in an upwards direction towards a nacelle and defining an enclosed space, wherein the tower further comprises a safety blanket distended across the tower interior along an inner surface of the wall to thereby split the enclosed space into an upper compartment above the blanket and a lower compartment below the blanket, wherein the safety blanket is flexible, and wherein the blanket comprises one or more incisions along the rim forming passages between the blanket and the wall.

16. A method of distending a safety blanket across the tower interior along an inner surface of a wall of a tower for a wind power installation, the method comprising:
   providing a safety blanket comprising a central portion and a rim extending circumferentially about the central part, the safety blanket being flexible; and
   using a fixation structure, stretching the blanket in an outwards direction towards the inner surface, wherein the fixation structure acts on the safety blanket at locations offset from the rim.

17. The method according to claim 16, wherein the safety blanket further comprises an incision along the rim forming a passage between the blanket and the wall, the method further comprising orienting the safety blanket relative to the wall so that a feature of the tower is received in the passage.

* * * * *

UNITED STATES PATENT AND TRADEMARK OFFICE
CERTIFICATE OF CORRECTION

PATENT NO. : 8,707,656 B2
APPLICATION NO. : 13/504657
DATED : April 29, 2014
INVENTOR(S) : Borge Ollgaard Page 1 of 1

It is certified that error appears in the above-identified patent and that said Letters Patent is hereby corrected as shown below:

TITLE PAGE

At [73], change "Wing" to --Wind--.

Signed and Sealed this
Sixteenth Day of August, 2016

Michelle K. Lee
*Director of the United States Patent and Trademark Office*